United States Patent [19]

Parietti

[11] 4,289,106
[45] Sep. 15, 1981

[54] PRESSURE REGULATOR FOR COMBUSTIBLE GASES, IN PARTICULAR FOR INTERNAL-COMBUSTION MOTORS

[76] Inventor: Pietro Parietti, Via Emilia Pavese 120, Piacenza, Italy

[21] Appl. No.: 55,726

[22] Filed: Jul. 9, 1979

[30] Foreign Application Priority Data

Jul. 21, 1978 [IT] Italy .................................. 25988 A/78

[51] Int. Cl.³ .......................................... F02M 21/02
[52] U.S. Cl. ................................. 123/527; 137/505.46
[58] Field of Search ....................... 123/527, 528, 529; 137/505.46, 505.47; 48/191

[56] References Cited

U.S. PATENT DOCUMENTS

| | | | |
|---|---|---|---|
| 2,248,222 | 7/1941 | Ensign | 123/527 X |
| 2,475,086 | 7/1949 | Ensign | 123/527 |
| 2,563,228 | 8/1951 | Ensign | 123/527 X |
| 3,960,126 | 6/1976 | Shinoda | 123/527 |
| 4,152,121 | 5/1979 | Van Der Weide et al. | 123/527 X |

*Primary Examiner*—Tony M. Argenbright
*Attorney, Agent, or Firm*—Ladas & Parry

[57] ABSTRACT

The purpose of the pressure regulator is to feed internal combustion motors or engines with combustible gases and it comprises two membranes 14 and 16 which respond to the intake suction of the motor, while the second of the said membranes actuates dislocating members 22 to check the communication between the said chambers A2 and A3 delimited by the said membranes and connected with the utilizer by means of a duct 30. One gauged nozzle 64 delivers part of the combustible gas into chamber A3 interested by the second membrane 16 and which is directly connected with the suction 30 of the motor or engine.

15 Claims, 3 Drawing Figures

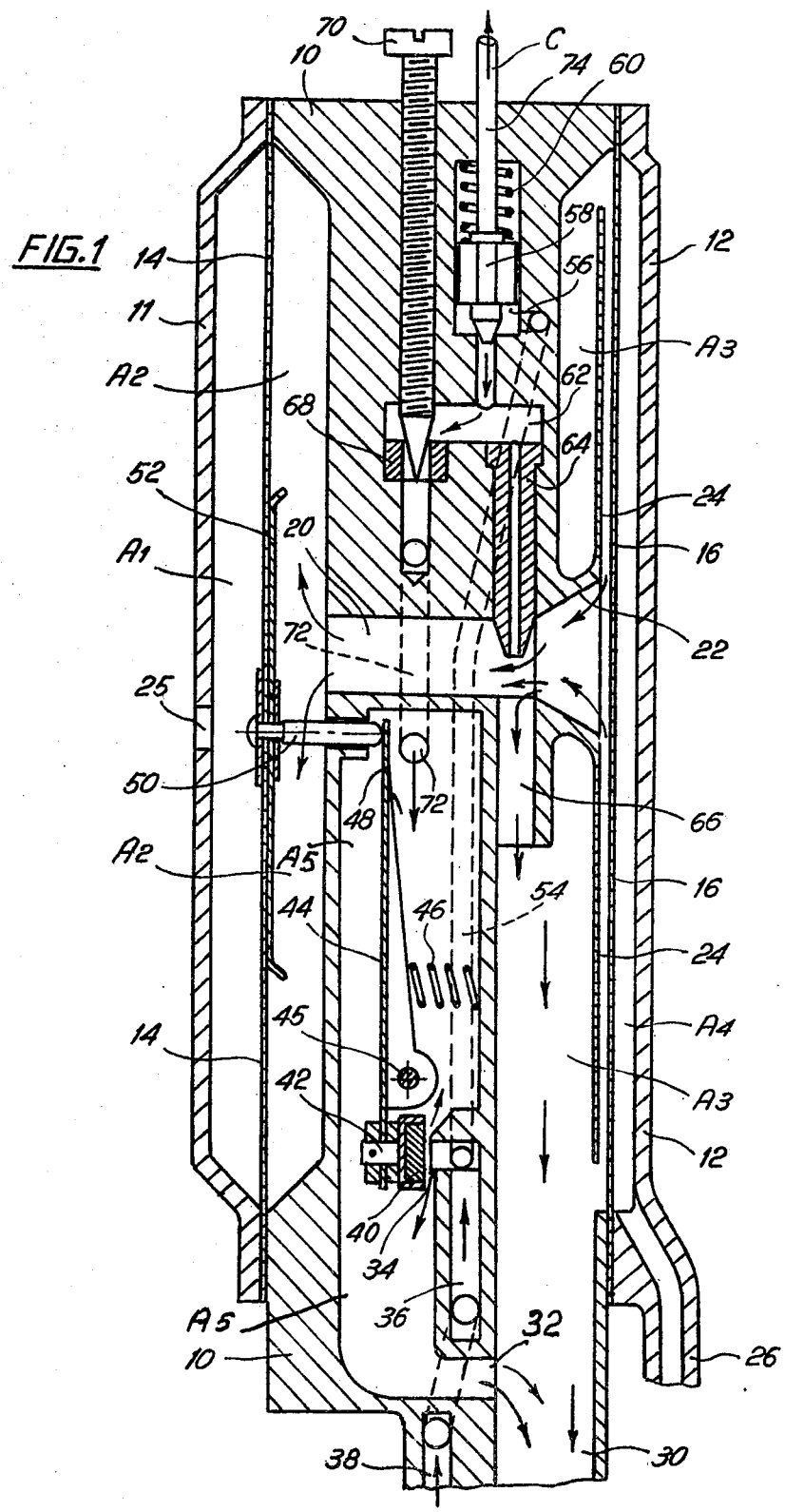

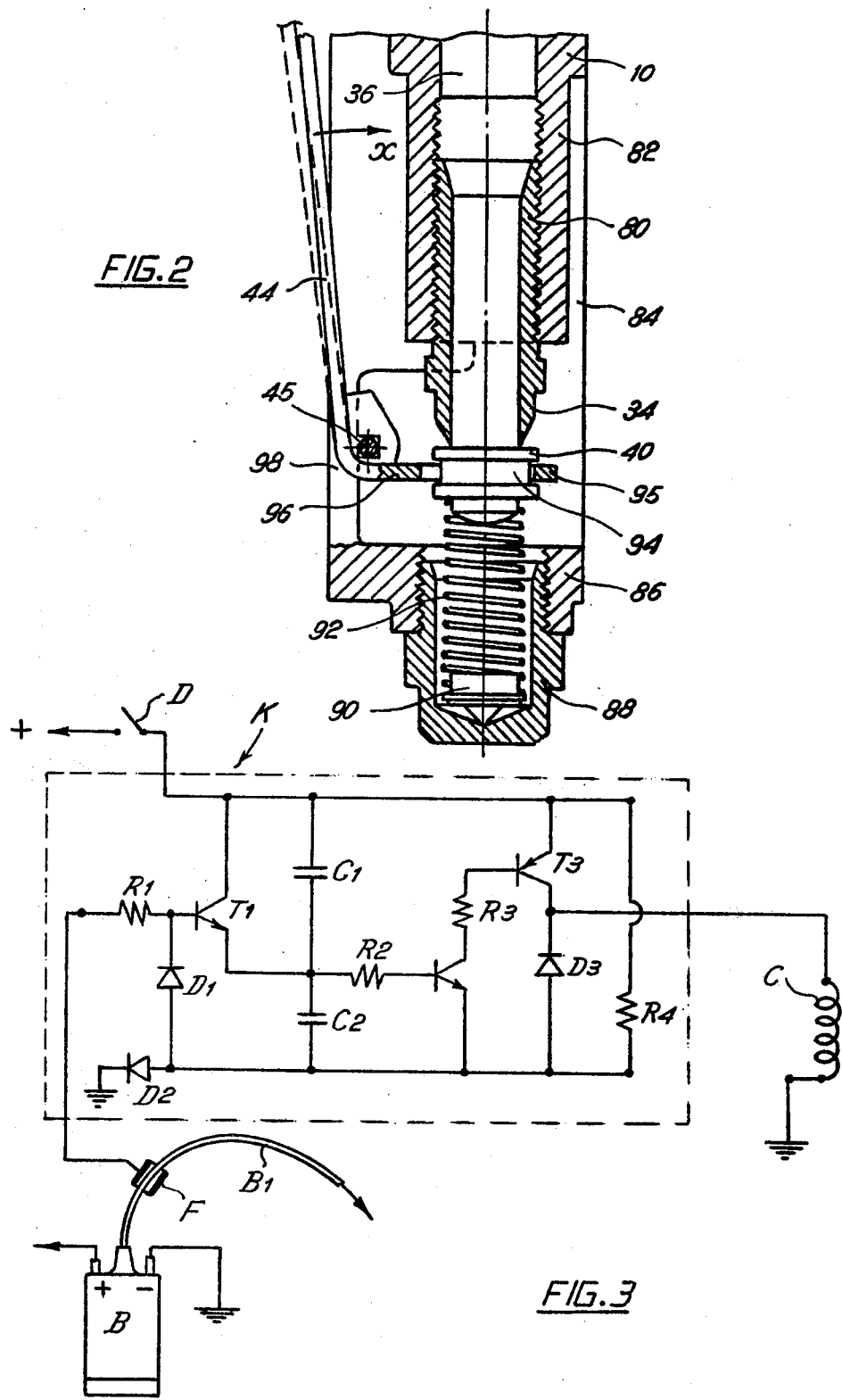

PRESSURE REGULATOR FOR COMBUSTIBLE GASES, IN PARTICULAR FOR INTERNAL-COMBUSTION MOTORS

The invention concerns a pressure regulator for combustible gases and finds application, particularly, but not exclusively, in the feeding of gaseous fuels to internal combustion engines. The end user's requirements regarding pressure regulators, in particular to feed internal combustion engines, are generally known. The said regulators must permit the immediate feed of gaseous fuel the engine at the start, that is, when the engine intake pressure is reduced. Whereas, after the engine has been started, the pressure regulation and hence the feed of gaseous fuel to the engine must be carried out in response, with a certain immediateness, to the variations of load to which the engine is submitted each time.

The object of the invention is to provide a pressure regulator capable of satisfying the above mentioned requirements, as well as others, and in particular to prevent overloads of the engine, when the engine attends to the start of a vehicle. In particular, the regulator of the present invention, responds fully and satisfactorily to the conditions necessary to obtain a rapid and safe start of internal combustion engines, especially in adverse ambiental conditions, while, on the other hand, the regulator varies, rapidly and in accordance with the ratio requested each time, the percentage of the mixture in response to the variations of load to which the engine is submitted.

The regulator according to the present invention comprises a throttling member between a source of pressurized combustible gas and a utilization device, a first membrane for actuating said throttling member in response to a pressure present in the utilization device, a second membrane, likewise responding to the pressure present in said utilization device, for actuating a throttling means designed to control the comunication between chambers partly defined by said membranes and connected by a duct of ample cross section with said utilization device, and at least one nozzle (gauged), for delivering the combustible gas directly into the chamber associated with the second membrane and connected with the above mentioned duct with an ample cross section.

With reference to the specific end uses of the pressure regulator, to feed internal combustion engines for automotive vehicles, the said pressure regulator includes check valves to check the feed of the nozzle or nozzles. Said check valves are operable to effect the start of the engine easily, since they make it possible to deliver combustible gas previously, to ensure the start of the engine also when it is under load.

The present invention concerns as well a system for feeding an internal combustion engine with combustible gases, wherein an advanced or simultaneous delivery of combustible gas with reference to the start, occurs automatically by means of the start of the engine itself. In this case the actuation of the check valves by driving the internal combustion motor, is realized by means of the most advantageous type, for example of the tachometric, pneumatic, electro-mechanic or electronic type, in particular if the internal combustion motor has electric or like igniting members.

The invention will be now described in the following description with reference to the annexed drawings, which illustrate, by way of example, an advantageous embodiment of the regulator according to the invention, which is applied to the feed of internal combustion engines.

In the drawings:

FIG. 1 is a schematic vertical cross-section of the pressure regulator;

FIG. 2 shows, on an enlarged scale, an alternative form of the throttling member employed by the pressure regulator to check the delivery of the gas to the utilization device;

FIG. 3 is the diagram of electric connections of a system which comprises the regulator of the invention for an internal combustion engine provided with an electric ignition.

The pressure regulator shown in the drawings consists of a metallic housing 10 provided with opposed cavities closed by covers 11 and 12 which retain rims of the two membranes 14 and 16. In this way, two pairs of opposed pneumatic chambers A1,A2 and A3,A4 are defined within the housing 10, the chambers A1,A2 of the first pair being separated from one another by means of membrane 14, whereas the chambers A3,A4 are separated from one another by means of the second membrane 16. The two chambers A2 and A3 communicate with one another through an ample duct 20 which delivers into chamber A3 through a funnel-shaped mouthpiece 22. The rim of mouthpiece 22 is co-planar with, and situated at a short distance from, the second membrane 16 and mouthpiece 22 is integral with a flange or plate 24 likewise parallel to membrane 16, for the purpose of preventing permanent deformations of membrane 16 during the displacements thereof. Furthermore, in the illustrated case, membrane 16 forms, together with the rim of mouthpiece 22, a throttling arrangement for the communication between the two chambers A2 and A3.

Chamber A1 is connected with the surrounding ambient through a bore 25 provided in the cover 11; in a different way, chamber A4 connects by means of a joint 26, provided by cover 12, with the fuel intake duct of the internal combustion engine in an appropriate position and in such a way that, in chamber A4, a pressure builds up, which is different from that present in chamber A3. For example, joint 26 can be connected to the intake duct below an air filter inserted in the said intake duct.

Chamber A3 connects, by means of a joint 30 (the cross section whereof is more than ample to handle the maximum quantity of gas which flows out of said chamber A3), with the intake duct for the purpose of establishing in chamber A3 a pressure substantially corresponding to the real pressure of intake, since the losses of load and the pressure drops are thus reduced.

Chamber A3 is in communication with a chamber A5, provided in housing 10, through a duct 32, disposed next to joint 30 which connects chamber A5 with the intake of the engine. The same chamber includes as well the fuel throttling means of the pressure regulator, comprising a nozzle 34 in communication with a chamber 36 connected, by means of a joint 38, with a source (not shown) of combustible gas under constant in pressure. The opening of nozzle 34 is checked by means of a throttle member 40 retained by a retainer 42 coupled to a lever 44 fulcrumed, by means of a pivot 45, to the walls of chamber A5. The said lever is under the influence of a spring 46, the action whereof causes the engagement of throttle member 40 with the corresponding seat which consists of the rim of nozzle 34. The outer end of lever 44 co-operates with the free end of a small plunger 50 slidably arranged in a guiding hole provided in the wall of chamber A5 and integral with, by means of a disk 52, the previously considered membrane 14. Thus, the displacements of the said membrane, due to the pressure variations in chamber A2, are transmitted, by lever 44, to throttle member 40 for checking the inlet of combustible gas from joint 38 via chambers 36 and A5 into the intake duct 30.

Chamber 36 for the pressurized gas is connected also, by means of a duct 54, with a chamber 56 provided in housing 10, wherein a valve 58 is slidably arranged said valve serving as an intercepting member which is engaged against the corresponding seat by means of the action exerted by a spring 60. Chamber 56 connects, through valve 58, with a second chamber 62 having a first gauged nozzle 64 discharging at the axis of duct 20. The opening of nozzle 64 is aligned and co-axial with the opening of a duct 66, the said duct being so disposed as to connect, as well, duct 20 with chamber A3. Chamber 62 is furthermore connected, through a second gauged nozzle 68 (effective passage cross-section of which can be varied by means of a screw type needle valve 70) and through a duct 72, with chamber A5, to complement and to integrate the feed of the combustible gas, in particular during the starting operation or during the overloads to which the engine may be submitted.

The valve 58 is integral with a stem 74 which is connected with an appropriate driving member, in order to actuate valve 58 in the direction of arrow C to deliver, when the utilizer requires it, combustible gas. In particular, valve 58 is utilized to deliver combustible gas a few seconds before the start of the utilization device. In the specific case of an internal combustion engine, the control of valve 58 can be checked by pressostatic means reacting to the variations in pressure of the intake duct of the engine; or otherwise, by means of a tachometric element responding to the speed of the engine; or also by an electric device in response to the electric energy which is used to ignite the combustible mixture supplied to the engine. This disposition facilitates the start of the internal combustion engine, even if said engine is submitted to loads. In this case, when the utiliser begins to start the engine, he first opens valve 58, which is normally closed due to the action exerted by spring 60, to forward combustible gas from chamber 62 through nozzles 64 and 68, into the intake duct 30, whereafter he starts the engine. As soon as the said engine starts, it immediately sucks in the combustible gas and causes throttle member 40 to open, so that the delivery of the combustible gas to duct 30 continues.

Examining FIG. 2 of the drawing and taking into account that the most essential and responding part of the regulator is the throttling member 40, said figure shows an advantageous embodiment of the said throttling member, wherein nozzle 34 is represented by a threaded pipe 80, registerably screwed to a corresponding appendix 82 in tubular form and integral with the cover or housing 10 of the pressure regulator.

Tubular appendix 82 retains also firmly a small fork 84, the outer and whereof is pierced (86) and threaded, in order to retain a plug 83. Said plug is hollow and houses, with pivoting freedom, a small pile 90 for a helical spring 92, the free end of which engages throttle member 40 which co-operates with nozzle 34. In the illustrated case the throttle member consists of a small cylindrical block having a peripheral groove 94 housing, with the possibility of advantageous play, a small fork 95 integral with the arm of a square lever 44; and with the bend 96 of square lever 44, there co-operates a pin 45 retained by the arms of a fork 98 integral with the outer end of fork 84, to fulcrum the said lever with a certain degree of freedom, in such a way that the displacements of the said lever cannot induce stresses into throttle member 40 which can lean the member against and adhere it entirely and evenly to the edge of nozzle 34. The displacements of lever 96 in the direction of arrow X, provide a shift, more or less, of throttle member 40, against the action of spring 92, to form, together with the edge of nozzle 34 and when said parts are near to each other a slit having a constant length all along the periphery thereof, through which the gas is allowed to flow into chamber A5.

The working or operational features of the pressure regulator of the foregoing description, will be now taken into consideration with reference to FIG. 3 which schematically illustrates electric circuitry of a system for feeding an internal combustion motor with combustible gas by means of the above mentioned pressure regulator. In FIG. 3, B indicates an ignition coil to be connected in a known manner with ignition plugs by means of a high tension conductor B1. The circuitry shown in FIG. 3 comprises also a delay circuit K of the electronic type, the output of which is connected with a solenoid winding C, the movable core of the solenoid to be operatively connected with stem 74 of valve 58. On the other hand, the energization of circuit K is controlled by means of a circuit breaker D which, in the case of an engine for automotive vehicles, consists of the same circuit-breaker as that which controls the start and the ignition of the said motor. The closure of circuit-breaker D polarizes a first transistor T1, the base whereof connects, for example by means of an inductive and/or capacitative coupling F, with the high-tension conductor B1 of ignition coil B. The emitter of transistor T1 connects, by means of a resistor R2, with further transistors T2 and T3 which, together with other component parts, provide for the control of the feed of solenoid winding C, previously described. As a consequence, the feed of winding C takes place, during a pre-determined period of time, previous to the operation of ignition coil B, that is previous to the continuous run of the engine and thereafter winding C continues to be excited, owing to the intervention of delay circuit K.

Consequently, after the aforesaid, to start the engine, the operator closes circuit breaker D, in order to activate delay circuit K, since transistors T2 and T3 are feeding solenoid winding C during a pre-determined period of time, for instance during two seconds; combustible gas is forwarded, by chamber 56, to the nozzles 64 and 68 and to chambers A3 and A5 and hence into the intake duct of the engine. When the engine is started, it begins with its activity, which continues with the intervention of the ignition coil B, since the high tension which—through the inductive couple and/or the capacitative couple M, activates transistor T1 which maintains the feeding circuit closed pertaining to solenoid winding C, after deactivating of delay circuit K.

Therefore, when the engine performs regularly, a certain under-pressure builds up in chamber A3, an under-pressure which is transmitted, through duct 20, into chamber A2, activating, by means of the deformation of membrane 14, the proportional opening of the throttle member 40. The combustible gas which flows out of nozzle 34 and that provided from gauged nozzle 68, establish in chamber A5 a certain pressure, by means of which the combustible gas, which is dosed, passes from the regulator through duct 32. It is pointed out, that the jet of combustible gas moving out of nozzle 64, enters into the co-axial duct 66 causing, in duct 20 and hence in chamber A2, a certain under-pressure, to increment the ejection of the gas from nozzle 34. On the other hand, the aspiration produced in duct 20 by the jet of gas ejected from nozzle 64, exerts its action as well on membrane 16 which closes, more or less, the passage between the said duct and chamber A3. It should be noted, that the deformation of membrane 16 is due to the difference in pressure, each time present in chambers A3 and A4 respectively and that corresponds to the pressures present in the intake duct, above and below respectively, of the air-filter. Thus the best conditions for feeding the motor are determined in the sense that—even if said motor is submitted to abrupt overloads, it reacts with immediateness and proportionally to the said overloads; whereas, when said overloads crease, the usual conditions are immediately reassumed.

Modifications and variations can be brought to the pressure regulator of the present invention, in relation to the specific end-uses thereof, in particular as regards the actuating means for valve 58.

In practice, the details of the embodiment of the pressure regulator and the end-uses thereof can vary in any case, without departing from the scope of the invention.

I claim:

1. A pressure regulator having an inlet duct and an outlet duct for connection between a source of gaseous fuel under constant pressure and a fuel intake duct of an internal combustion engine, respectively, said regulator comprising a first assembly having a first membrane operatively connected at one side to a check valve and having said one side in communication via a central duct with one side of a second membrane and with said inlet duct, said one side of the second membrane cooperating with an adjacent rim of said central duct, a nozzle for introducing a jet of the gaseous fuel from said inlet duct into said central duct behind said rim, and a duct aligned with the nozzle so as to provide a path for said jet out of said central duct towards said inlet duct, the arrangement being such that a reduction of gaseous fuel pressure on said one side of the second membrane deforms said second membrane to cover said rim causing a reduction of gaseous fuel pressure in said central duct complemented by a reduction of gaseous fuel pressure therein caused by said jet, the reduced pressure being transferred to said one side of said first membrane to deform said first membrane in a manner to open said check valve, said check valve being located in a passage between said inlet duct and said outlet duct.

2. A pressure regulator for feeding gaseous fuel from a pressurized source to a fuel intake duct of a utilization device such as an internal combustion engine, said regulator comprising:
   (a) an inlet duct (38) for connection to said pressurized source of gaseous fuel;
   (b) an outlet duct (30) for connection to said fuel intake duct of said utilization device;
   (c) first throttle means (34,40) interposed between said inlet duct (38) and said outlet duct (30);
   (d) a first membrane (14) responsive to pressure in said outlet duct (30) for operating said first throttle means (34,40);
   (e) second throttle means (16,22);
   (f) a second membrane (16) responsive to pressure in said outlet duct (30) for operating said second throttle means (16,22);
   (g) a first chamber (A2) partly defined by said first membrane (14) and a second chamber (A3) partly defined by said second membrane (16), a path (20) of communication between said chambers (A2,A3) being controllable by said second throttle means (16,22), said chambers being connected to said outlet duct (30); and,
   (h) at least one gauged nozzle (64) for feeding gaseous fuel from said inlet duct (38) as a jet into said second chamber (A3) to cause said first membrane (14) to open said first throttle means (34,40) and said second membrane (16) to close said second throttle means (16,22), thereby to control the feed rate to the utilization device.

3. A pressure regulator according to claim 2, wherein said gauged nozzle (64) is associated with a pipe (66) spaced apart from said nozzle and having its aperture disposed in a pipe (20) connecting said second chamber (A3) to said first chamber (A2), so that a gas jet from said nozzle will create such a reduction of pressure in said first chamber (A2) as to deform said first membrane (14) and actuate said first throttle means (40).

4. A pressure regulator according to claim 3, wherein said pipe (20) receiving the aperture of said nozzle (64) ends in a region of said second chamber (A3) in a funnel shaped branch (22) whose rim cooperates with said second membrane (16), thereby to change the passage between said second chamber (A3) and said pipe (20).

5. A pressure regulator according to claim 4, wherein said rim of the funnel shaped branch (22) is equipped with a flange (24) for minimizing the deformation of said second membrane (16).

6. A pressure regulator according to claim 2, wherein said first throttle means (34,40) is arranged in a complementary chamber (A5) connected through a large section aperture (32) to said outlet duct (30).

7. A pressure regulator according to claim 6, wherein a second gauged nozzle (68) is associated with an adjustable member (70) for feeding said complementary chamber (A5) with a feeding quantity of gaseous fuel for the utilization device independently of any action by said first throttle means (34,40).

8. A pressure regulator according to claim 6, wherein said first throttle means (34,40) comprises a small block (40) provided with a peripheral groove (94) to engage loosely and in a rocking manner the arms of a fork (95) integral with a lever (44), the free end of said lever being operatively connected with said first membrane (14), while opposed ends of said block (40) cooperate, one end with the rim of a nozzle component (34) of said first throttle means to check the quantity of gas delivered and the other end to retain one of the ends of a spring (92) coaxial with said nozzle component and the action of which tends to engage said block (40) with said rim of said nozzle component (34).

9. A pressure regulator according to claim 8, wherein said spring (92) is retained, at the other end thereof, by a small pile (90) housed articulatedly on the bottom of a hollow plug (88), so as to ensure coaxial alignment and parallelism between the sealing surface of the said block and the sealing surface of the nozzle (34).

10. A pressure regulator according to claim 2, wherein said gauged nozzle (64) which is directly fed by the combustible gas ends in a feeding chamber (62) connected with said pressurized gas inlet duct (38)

through a spring-loaded intercepting member (60) operable in accordance with at least one operating condition of said utilization device.

11. A pressure regulator according to claim 2, wherein a third chamber (A4) is opposed to said second chamber (A3) partly defined by said second membrane (16) and is hermetically closed except for a joint (26) provided for connecting said third chamber (A4) to said utilization device.

12. A pressure regulator according to claim 10, in combination with an internal combustion engine, said combination comprising an actuating member (C) responsive to an operating condition of said engine and operatively connected to said spring-loaded intercepting member (60).

13. The combination according to claim 12, wherein said actuating member (C) is energized by a time delay circuit (K) whose activation immediately prior to the start of said engine brings about a full feed of the gaseous fuel to the engine intake as soon as said engine is started.

14. The combination according to claim 13, wherein said engine is provided with electric ignition and wherein at least one reactance coupling (F) is associated with the igniting means (B) of the engine for exciting said actuating member (C) through said delay circuit (K) in such a way that, when said engine operates, said spring-loaded intercepting member (60) is maintained open in order to feed gaseous fuel through a nozzle (68) to the engine intake duct.

15. The combination according to claim 14, wherein said second membrane (16) partly defines a third chamber (A4) opposed to said second chamber (A3) and connected with the engine intake duct at a point below an air filter disposed in said intake duct.

* * * * *